(No Model.)

C. L. WILKINS.
STOVE PIPE DAMPER.

No. 306,301. Patented Oct. 7, 1884.

Witnesses:
J. H. Blackwood
Rhesa G. Du Bois

Inventor:
Charles L. Wilkins
By M. H. Doolittle
Attorney

N. PETERS. Photo-Lithographer, Washington, D. C.

UNITED STATES PATENT OFFICE.

CHARLES L. WILKINS, OF COLUMBUS, OHIO.

STOVE-PIPE DAMPER.

SPECIFICATION forming part of Letters Patent No. 306,301, dated October 7, 1884.

Application filed January 14, 1884. (No model.)

*To all whom it may concern:*

Be it known that I, CHARLES L. WILKINS, a citizen of the United States, residing at Columbus, in the county of Franklin and State of Ohio, have invented certain new and useful Improvements in Stove-Pipe Dampers; and I do hereby declare the following to be a full, clear, and exact description of the invention, such as will enable others skilled in the art to which it appertains to make and use the same.

My invention relates to that class of dampers for stoves and other pipes constructed with a single bearing in one side only of the pipe-section; and it consists in an improvement in the form and arrangement of several of the parts by which such a damper is held in place and operated. It is illustrated in the accompanying drawings, in which—

Figure 1:
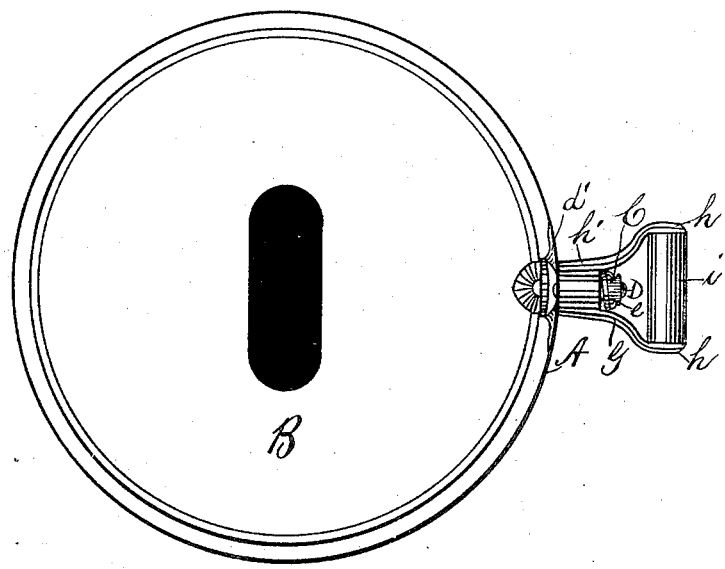
Figure 2:
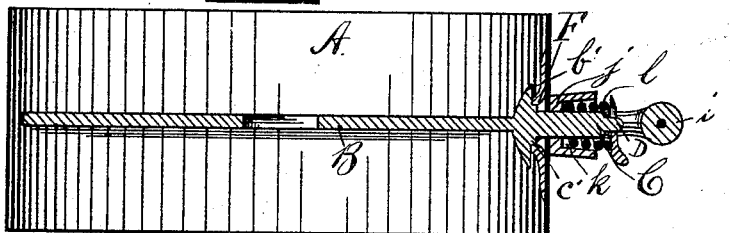
Figure 3:
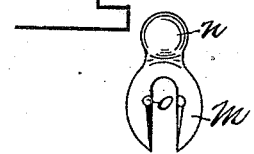

Figure 1 is a plan view of my improved damper attached to a pipe-section; Fig. 2, a longitudinal section, and Figs. 3, 4, and 5 detached views of separate parts.

In the drawings, A represents a section of pipe, B the damper, and C the shank of the damper cast thereon. At the point where the damper and shank join, the damper is provided with shoulders $b'$. The shank C, which is polygonal or square shaped, is provided with a collar-bearing, $c'$, back of the shoulders $b'$ on the damper, and at its outer end with a round projection, D, having arms or spurs $e$.

Figure 4:
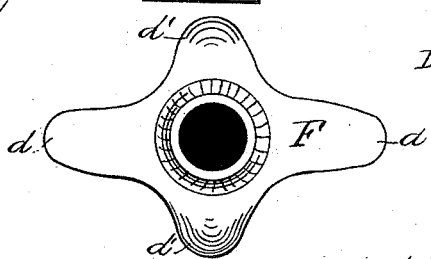
Figure 5:
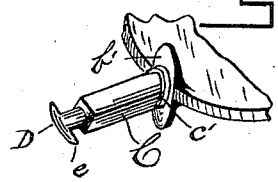

F is a washer or collar of the form shown in Fig. 4, adapted to ride upon the collar-bearing $c'$ on the shank and abut against the shoulders $b'$ on the damper. It is provided with arms $d\ d\ d'\ d'$, the outer surfaces of which are adapted to fit closely to the pipe, the horizontal arms $d'\ d'$ being curved inward slightly at their outer ends to correspond to the contour of the pipe.

G is a handle, carrying between two arms, $h$, a wooden round, $i$, and which arms terminate in a cylindrical portion, $h'$, provided with a square-shaped entrance, $j$, adapted to receive the shank C. The space $k$ above the entrance $j$ is open and round, and within it is placed a spiral spring, $l$, which rests upon the square sides of the entrance $j$.

M is a retaining cap or clamp, slotted and provided with notches $o$—one on each side of the slot—and with a lug, $n$, which answers as a finger-piece to operate the same.

In applying these parts to a section of pipe, the washer F is first placed over the shank; the damper is then inserted in the pipe, and the shank is passed through a hole in one side of the pipe. The handle, into the recess $k$ of which is first placed the spiral spring $l$, is then put on the shank, and the clamp is applied by pressing down the spring and pushing the forked arms of the clamp under the spurs $e$ of the shank until the spurs pass into the notches $o$ of the clamp, when the clamp is locked and the handle held rigidly and securely to the pipe by the reactionary pressure of the spring. By pressing upon the lug $n$ and turning the clamp M to the right or left it is disengaged from the spurs $e$ of the shank, and all the parts can then be readily detached.

It will be seen that the number of separate parts employed are few—not exceeding five, including the damper—and can be cheaply and durably made, and not liable to get out of order.

By reason of the form of the shank and the action of the retaining-clamp and the arrangement and operation of these and the other connecting parts, washers, collars, and similar devices usually employed to hold the handle to the shank are dispensed with, and by the action of the spring and the retaining-clamp described the parts can be easily and quickly applied to any sized pipe, whether stove or other pipes, the damper or valve held securely at any angle, and its free and unobstructed rotation insured.

I am aware of the single-bearing damper of Natchez in Patent No. 230,805, in which is described a bayonet-handle inserted through the pipe and provided with a shouldered disk to go inside the pipe and an outer flat portion and engaging shoulders, in combination with a spiral spring and a slotted and recessed clamping-plate adapted to be slipped over the handle and held against the said spring by means of the engaging shoulders, to clamp the handle and damper in place; but by my invention I dispense with such a handle and inner disk cast thereon, and such a clamping-plate, and the outside independent annular disk, and employ in place thereof less parts and a more simple construction, as hereinabove described.

Having thus described my invention, what I claim is—

1. A damper for stove and other pipes, provided with a shank or spindle polygonal or square shaped in form, cast therewith, and having at its outer end spurs to receive a retaining-clamp, in combination with said clamp and a suitable handle, substantially as described.

2. The combination of the damper B, provided with shank C, the washer F, the handle G, the spiral spring, the clamp M, and the pipe, arranged substantially in the manner and for the purposes described.

In testimony whereof I affix my signature in presence of two witnesses.

CHARLES L. WILKINS.

Witnesses:
T. J. DUNCAN,
R. H. COTTON.